Figure 1:
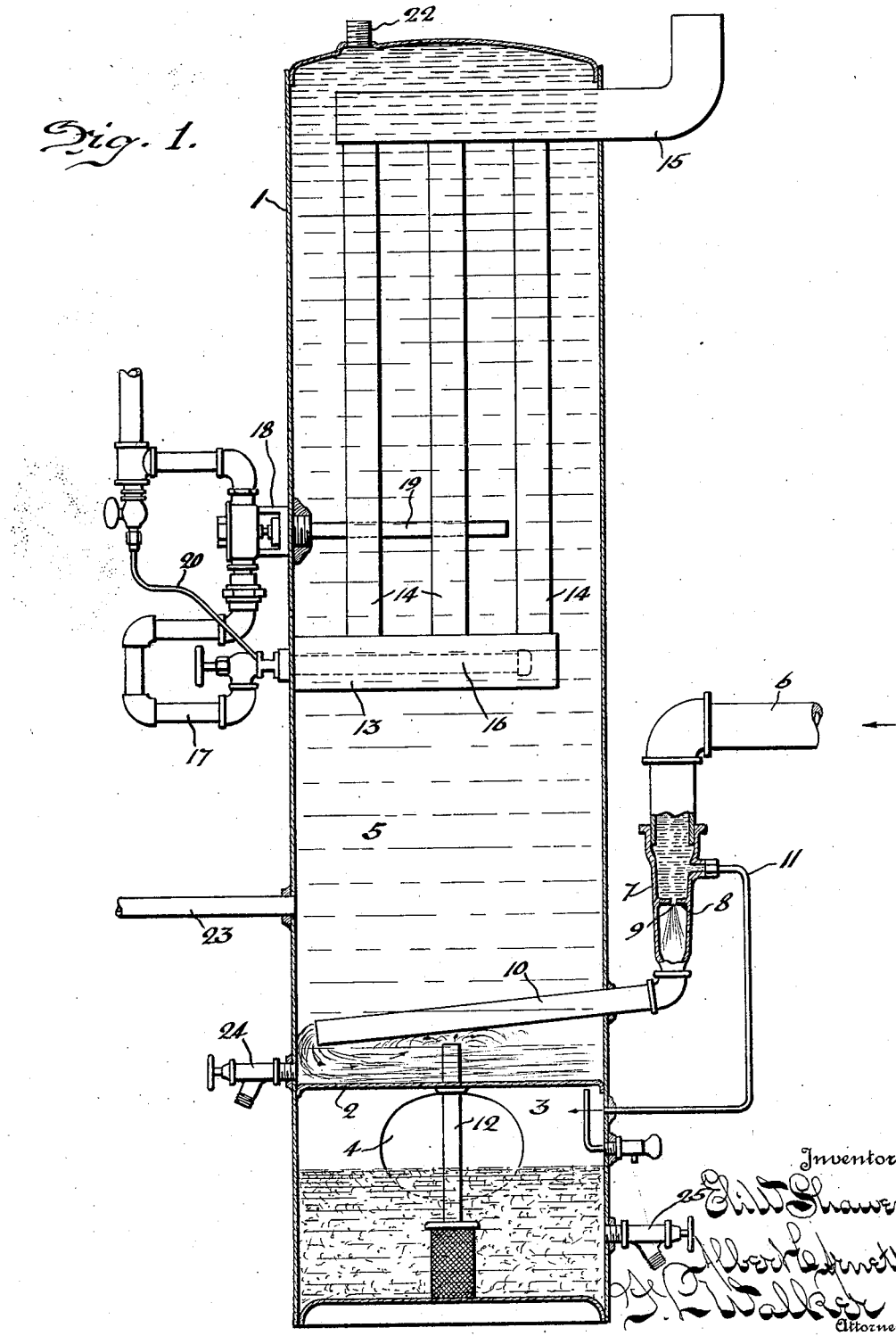

Feb. 2, 1932.  E. W. SHAWEN ET AL  1,843,374
WATER SOFTENER
Filed Jan. 16, 1928   2 Sheets-Sheet 1

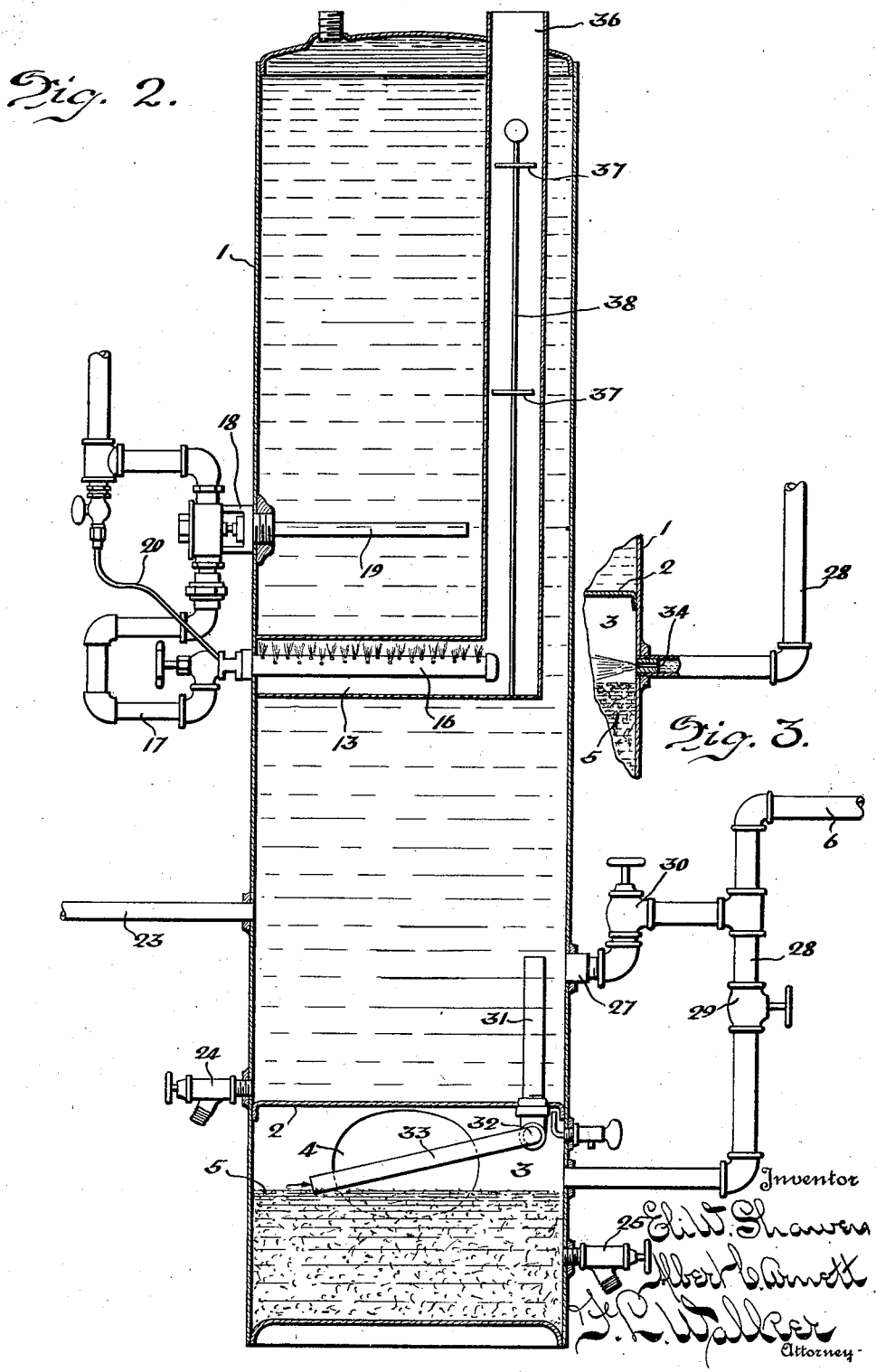

Patented Feb. 2, 1932

1,843,374

UNITED STATES PATENT OFFICE

ELI W. SHAWEN AND ALBERT C. ARNETT, OF DAYTON, OHIO

WATER SOFTENER

Application filed January 16, 1928. Serial No. 247,125.

Our invention relates to water softeners and heaters for household or domestic use, and more particularly to the combination apparatus wherein the water is softened and subsequently heated and from which the water may be drawn at different points, either heated or unheated.

In many parts of the country the natural water is highly charged with lime or other minerals which render it unsuitable and unfit for household use, for laundry use, or bathing purposes. In such water, which is known as "hard" water, soap will not lather or form a suds. In order that such water may be used for general purposes it must be "softened," either by precipitation or by neutralization of the mineral contents. There are various methods of "softening" such hard water. One of the popular methods at the present time is by the circulation of the hard or raw water through a filter bed of base exchange material, generally known as zeolite. This filtering method is not entirely uniform in operation, and the degree of hardness of the water passing therethrough will vary from time to time in accordance with the condition of the filter bed. Such filter softener requires constant attention and frequent rejuvenation or regeneration of the filter bed. The present construction is designed to overcome the objections and difficulties of such filter type softener, by providing a supply of softening or neutralizing agent in a concentrated form, which is automatically fed into a hard water supply in predetermined quantities. The arrangement is such that this charge of concentrated softening agent is introduced by the flow of hard or raw water to be softened.

The tank or container for the supply of softened water is provided with a chamber projecting thereinto and in which is located a gas burner for heating the softened water within the tank. A flue leads from the burner chamber upwardly through the body of water and discharges from the top of the tank. The operation of the gas heater or burner is automatically controlled by a thermostat projecting into the body of heated water and automatically controlling a gas valve to increase or diminish the supply of gas to such heater in accordance with fluctuations of the water temperature.

The object of the invention is to simplify the structure, as well as the means and mode of operation of water softeners and heaters, whereby they will not only be cheapened in construction but will be more efficient in use, automatic in their action, uniform in operation and unlikely to get out of repair.

A further object of the invention is to provide an improved form of water softening apparatus wherein the softening agent is automatically introduced in proportion to the quantity of hard or raw water to be treated.

A further object of the invention is to provide for insuring the uniform density or character of the softening agent.

A further object of the invention is to provide an improved form of heating apparatus and to embody such heater means in the water reservoir in such manner as to afford maximum efficiency or minimum loss of heat units.

A further object of the invention is to provide automatic means for controlling the burner or heater.

With the above primary and other incidental objects in view, as will more fully appear in the specification the invention consists of the features of construction, the parts and combination thereof and the mode of operation, or their equivalents, as hereinafter described and set forth in the claims.

In the accompanying drawings wherein are shown the preferred, but obviously not necessarily, the only form of embodiment of the invention, Fig. 1 is a vertical sectional view of the combined water softener and heater forming the subject matter hereof. Fig. 2 is a vertical sectional view of another embodiment of the invention. Fig. 3 is a detail view of a modification.

Referring to the drawings, 1 is a vertical cylindrical tank or container having adjacent to its bottom a transverse head or partition 2 forming there below an auxiliary chamber 3 to contain the supply of softening material. Obviously the softening material chamber may be formed separate from the tank. This softening material is preferably of a solid or granular form and is introduced into the chamber 3 through a charging door or hand hole opening 4. This material is soluble in water and a concentrated solution of the softening agent is retained in the chamber 3 immediately above the supply body 5 of chemical softening agent. A water supply conduit 6 leads to the softener. Interposed in the supply conduit is a Venturi tube 7, having therein a diaphragm 8 in which is a reduced orifice 9. An extension conduit 10 projects within the upper chamber of the container 1 to approximately the opposite side of the tank. This conduit extension 10 is somewhat downwardly inclined. The incoming raw water discharged from the nozzle 10 impinges upon the inner wall of the tank and is thereby deflected to cause agitation and distribution and intermixture of the inflowing raw water with the softening solution.

The downward inclination of the extension 10 tends to induce a return current of raw water across the tank immediately above the head 2. The provision of the Venturi tube 7 with its perforate diaphragm 8 causes a slight retarding of the flow of water, causing a back pressure within the tube above the diaphragm and a reduction of pressure below the diaphragm and in the conduit extension 10. Leading from the high pressure area of the Venturi tube 7 is a by-pass tube 11 which communicates with the chamber 3, admitting thereto a small quantity of water under the higher pressure developed in the tube 7. The quantity of water so admitted is determined by the capacity of the tube 11 or by the size of an orifice therein. The tube capacity may be reduced by inserting a bushing or by contracting the end of the tube to afford an orifice of less size.

Extending from a point in proximity to the bottom of the chamber 3 is a vertical tube 12, which projects through the head 2 and terminates a short distance thereabove, but preferably below the level of the conduit extension 10.

Normally a uniform pressure is maintained in the lower chamber 3 and in the upper or soft water supply chamber 1. Whenever the outlet conduit from such tank is opened to draw a supply of water, the pressure in the upper chamber of the tank is accordingly reduced and in the tendency for equalization of pressure a flow is induced from the lower softening material 3 through the pipe 12 into the upper chamber of the tank 1. Reduction of pressure also permits a flow of water through the supply conduit 6 which, entering the upper chamber of the tank 1 through the conduit extension 10 is met by the flow of concentrated solution of softening material entering through the tube 12. This supply of softening material in solution is intermingled with and diffused through the supply of hard water entering through the conduit 6 and inlet 10 and reacts upon the lime and other mineral contents of such supply of hard water, causing such mineral contents to be precipitated or to be neutralized. The slight reduction of pressure within the chamber 3 by the transference of the solution of softening material to the chamber 1 reduces the pressure within this chamber as well as the upper chamber below that of the supply conduit 6, and thereby permits a limited flow of water under pressure through the bypass or conduit 11 into the lower chamber 3 to replenish the saturate solution within such chamber. Obviously there will be no flow of the chemical softening reagent from the lower chamber 3 into the upper chamber of the tank 1 except when water has been drawn from the tank 1, thereby lowering the pressure therein below that of the supply conduit 6, at which time water is admitted to both the lower chamber 3 and to the upper chamber of the tank 1. The flow of saturate solution of water softening reagent from the lower chamber 3 to the water supply chamber is in direct proportion to the quantity of hard water submitted through the inlet 10. The apparatus requires no attention and its operation is entirely automatic.

It has been found that lime and other "hardening" minerals are more easily and thoroughly precipitated or neutralized, as the case may be, by warming the water to which the softening solution has been added. Ordinarily a large proportion of soft water for domestic or household use is required to be heated. Ordinarily hot water supply tanks are employed having external heating means. In the present instance the tank or container 1 is provided with a burner chamber 13 extending horizontally within the tank 1 and at a mid-height point. From the inner end of this burner chamber 13 there extends a plurality of vertically disposed flues 14 communicating with an outlet manifold 15. This construction prevents the too rapid escape of the generated heat and products of combustion, and insures distribution having the body of softened water. Extending within the burner or heater chamber 13 is a gas burner 16 of the perforated tubular type supplied through a gas supply conduit 17. This gas supply conduit 17 includes an automatically controlled valve 18. This control valve 18 is regulated by a thermostatic tube 19 projecting within the tank 1 and subjected to variations of temperature of the body of softened water therein. The thermostatic control element and the regulating valve 18 may be of any suitable type of which there are suitable forms upon the market and they do not per se form any part of the present invention herein and they have not been illustrated in detail.

Leading from the gas supply conduit 17 to the burner 16 is a bypass 20 which supplies a pilot burner or jet independent of the valve 18 so that there will always be a pilot flame to ignite the burner 16 even though the supply of gas to such burner shall have been entirely cut off by the action of such thermostatic control 18. Inasmuch as the warm water will ascend to the top of the tank and the cool water will remain at the bottom the hot water service outlet 22 is provided communicating with the upper level of the body of softened water therein. A second service outlet 23 is provided adjacent to the bottom of the upper compartment of the tank 1 through which a supply of cool water may be drawn from the tank. It will be understood that both the supply of hot and cold water will have been softened by the action of the small quantity of softening agent intermixed therewith at the time the water supply is admitted to the tank through the inlet conduit 6 and tube 12. A drain cock 24 is provided immediately above the transverse head or partition 2 by which the precipitated sludge may be drained from the upper portion of the tank 1. An additional drain cock 25 is located in the lower portion of the chamber 3 to permit the drainage of such chamber provided at the top of the chamber 3 through which air may be purged in such chamber. Inasmuch as the discharge opening of the tube 12 into the upper compartment of the tank 1 is quite small, very little water will be lost from the upper compartment during the recharging of the lower chamber 3. It is therefore not essential that the upper chamber is drained at such time.

In Fig. 2 there is shown a modification wherein a water supply conduit 6 discharges into the tank or container 1 at the point 27 adjacent to the bottom of the upper or soft water chamber. A branch conduit 28 leads from the supply conduit 6. This branch conduit 28 is controlled by a valve 29 to admit only a predetermined proportion of the water supply to the chemical or softening agent chamber 3. A valve 30 in the supply conduit, when partially closed, creates a back pressure in the conduit 6 and in a branch conduit 28 with a consequent reduction of pressure into the tank through the entrance 27. The quantity of water admitted to the supply chamber 3 for softening material is sufficient to maintain a substantially saturate solution of such chemical softening agent under pressure within the chamber 3.

Leading through the head 2 from the chamber 3 into the soft water supply chamber of the tank 1 is a tube 31 which terminates in close proximity to the inlet orifice 27 from the supply conduit 6. At its lower end the tube 31 is flexibly connected at 32 with an inclined tube 33 resting upon the body of the solid or granular softening agent within the chamber 3. As the body of softening agent is reduced the flexibly connected tube 33 descends with the level of such supply body 5 upon which it is supported. By this means the supply of softening agent in solution is drawn from the stratum immediately above the solid or granular body 5 thus insuring a saturate solution of substantially uniform character. In lieu of the control valve 29 in the branch conduit 28, such conduit may be provided with a reduced orifice 34 discharging into the chamber 3 as shown at 35 in Fig. 3. When the body 5 of chemical reagent has been exhausted, the hand hole or charging door 4 is opened after shutting off the water supply of the conduit 6 and a fresh charge of material is introduced beneath the flexibly connected pipe 12 which is elevated above the level of such charge. In Fig. 2 the heater chamber is shown with but a single flue 36 leading out of the tank. In this flue are one or more baffles 37 supported on a rod 38 to prevent too rapid escape of the products of combustion before the heat thereof is absorbed by the water.

From the above description it will be apparent that there is thus provided a construction of the character described, possessing the particular features of advantage before enumerated as desirable, but which obviously is susceptible of modification in its form, proportions, and arrangement of parts, without departing from the principle involved or sacrificing any of its advantages.

While in order to comply with the statute the invention is described in language more or less specific as to structural features it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. In an apparatus of the character described, the combination with a tank and a diaphragm in the tank dividing it into an upper compartment for water to be softened and a separate lower compartment for softening agent, of a supply conduit for hard water leading to the water compartment, back pressure creating means in the water supply conduit, and a high pressure branch conduit leading from the supply conduit to the softening agent compartment through which water is discharged into the softening agent compartment under greater pressure than water is discharged from the supply conduit into the upper compartment simultaneously with the discharge of water into the upper compartment of the tank, and a passage through the diaphragm from the lower compartment into the upper compartment water charged with softening agent subsequently passes into the tank.

2. In an apparatus of the character described, the combination of a tank, a diaphragm within the tank by which the tank is divided into an upper compartment for water to be softened, and a lower compartment for water softening agent, an intercommunicating conduit extending through the diaphragm between the compartments, from the bottom of the lower compartment for softening agent and discharging into the upper water compartment, a supply conduit for hard water common to both compartments, and means for inducing a higher inlet pressure therefrom to the softening agent compartment than to the water compartment of the tank.

3. In an apparatus of the character described, a tank to receive water to be softened, and a compartment for water softening agent communicating therewith, a connecting conduit between the bottom of the body of liquid water softening agent in the compartment, and the bottom of the tank for water to be softened, a supply conduit for hard water communicating simultaneously with the tank and compartment, regulating means in said conduit for effecting a variation of pressure of the water supplied to the tank and compartment respectively comprising a fitting in the supply conduit, having a permanently open restricted orifice therein of less capacity than the conduit beyond such orifice through which water is supplied to the tank and a permanently open branch conduit leading from the supply conduit at the high pressure side of the restricted orifice to the compartment for water softening agent whereby water will be supplied to said compartment at a greater pressure than to the tank.

4. In an apparatus of the character described, a unitary structure including, a tank, a diaphragm dividing the tank into a compartment to receive water to be softened, and a compartment for water softening agent, a supply conduit for hard water and means for effecting delivery therefrom of water simultaneously to said water compartment and softening agent compartment under higher delivery pressures to the water compartment than to the softening agent compartment and an adjustable conduit extending through the diaphragm affording communication between the respective compartments, said conduit normally resting upon the body of softening material in the softening agent compartment and automatically descending within the compartment in unison with the lowering of the level of the supply of softening material, through which a solution of water softening material is supplied to the water compartment, a current flow is induced through the compartment and into the tank simultaneously with the inflow of water directly into the tank.

In testimony whereof, we have hereunto set our hands this 12th day of January A. D. 1928.

ELI W. SHAWEN.
ALBERT C. ARNETT.